United States Patent Office
3,365,718
Patented Jan. 23, 1968

3,365,718
DEVICE FOR DISTURBANCE SUPPRESSION IN A RADAR EQUIPMENT
Erik Stellan Holger Borg, Rotobro, Sweden, assignor to North American Philips Company, Inc., New York, N.Y., a corporation of Delaware
Filed Aug. 19, 1966, Ser. No. 573,695
Claims priority, application Sweden, Aug. 31, 1965, 11,366/65
8 Claims. (Cl. 343—17.2)

ABSTRACT OF THE DISCLOSURE

A radar system of the type in which the frequency of transmitted pulses continuously varies. The received signal is integrated, and when the integrated value exceeds a given value, it is employed to initiate the charging of a capacitor to a voltage equivalent to the transmitter frequency. The stored voltage is compared with voltages corresponding to transmitter frequency at subsequent pulse intervals, in order to block the output of the receiver when a coincidence occurs.

---

Figure 1:
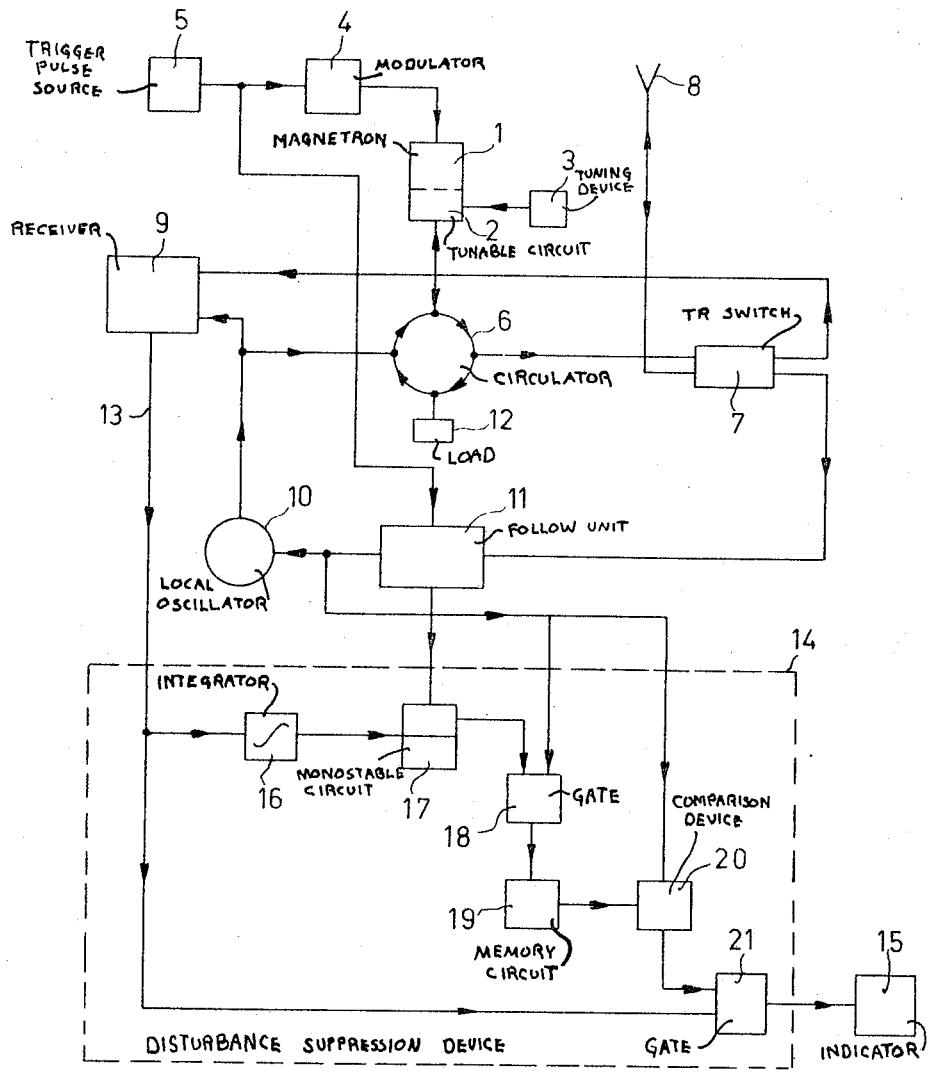

The present invention relates to a device for the suppression of disturbances in a radar equipment adapted for transmission of pulses of varying frequency. The equipment comprises a continuously tunable transmitter tube with means for instantaneous excitation (i.e. triggering) of the tube. The frequency of the transmitted pulse is determined by the tuning at the triggering moment. A receiver is tuned for reception of echo pulses of the same frequency as the transmitted pulse, during a certain time after transmission of a pulse, i.e. the echo pulse interval. Means are also provided for producing during the echo time interval a magnitude which represents the frequency of the transmitted pulse. The object of the invention is more particularly, in a device of this kind operating with frequency varying from pulse to pulse, to prevent indication on an indicating device associated with the equipment, for example a PPI-screen, of a continuous small frequency band disturbance signal having a frequency within the frequency range of the transmitted pulses. If no special measures were taken for suppressing such disturbance signals this will result in that, as soon as the frequency of a transmitted pulse coincides with the frequency of the disturbance signal, a continuous reply signal corresponding to the disturbance signal will be fed to the indicator during the whole following echo time interval resulting in a disturbing line on the PPI-screen. As the pulse frequency in a system with frequencies varying at random will coincide occasionally with the disturbance frequency, a great number of such radial disturbance lines will be produced in an irregular distribution across the screen which will decrease the possibility or even prevent evaluation of the picture.

The object of the invention is to eliminate the influence of such disturbance signals. This is achieved by providing means for blocking the reply during such intervals when the magnitude representing the frequency of the transmitted pulse assumes a certain value given by the condition of a memory device and which magnitude represents the value of the said magnitude during those intervals in the foregoing when the integrated value with time of the reply exceeds a certain level.

The receiver usually comprises a local oscillator which is locked in frequency during the echo time interval on a value which is related in a predetermined way to the tuning frequency at the triggering moment, for example coincides with the said frequency. The tuning of the receiver is effected by mixing the local oscillator voltage with incoming echo pulses and then filtering the mixing product in a band pass filter which is tuned to the selected intermediate frequency. After detection the resultant video signal is fed to the indicating device, for example a PPI-screen. It is in this case suitable to integrate the video signal in an integration device and unblock the memory device at a certain value on the magnitude produced by the integration so that the said magnitude representing the frequency of the transmitted pulse is stored in the memory device during such an interval to following intervals.

It is furthermore suitable to use the control voltage of the local oscillator as a measure of the frequency of the transmitted pulse, in which case the memory device is adapted to store a voltage corresponding to the value of the control voltage during those intervals when the said integrated value has been exceeded.

The memory device will then at appearance of a disturbance of said kind after a transient interval contain a measure of the value of the control voltage during the disturbed intervals. As soon as the control voltage in the following assumes this value this will result in the video signal becoming blocked.

Figure 2:
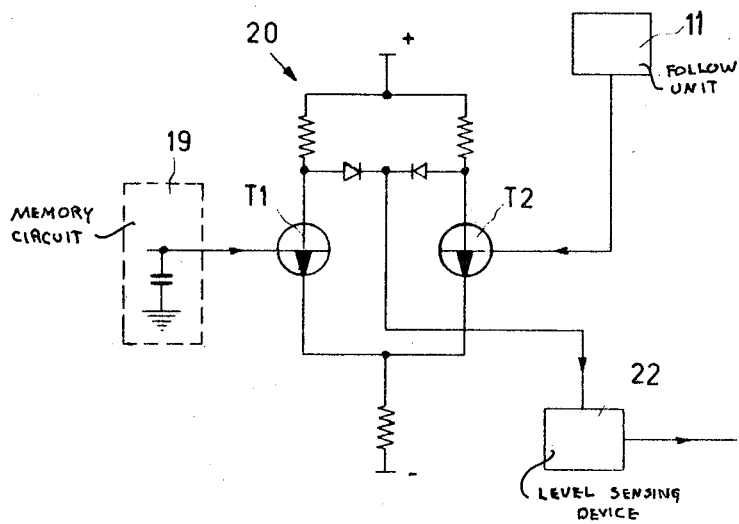

The invention is now explained more fully with reference to the accompanying drawing, in which:

FIG. 1 shows a block diagram of a radar equipment with an arrangement according to the invention and FIG. 2 shows a circuit diagram of a unit included in the equipment according to FIG. 1.

The transmitter tube in the shown equipment is formed by a magnetron 1 having a tunable output circuit 2, which tube may for example be the tube described in the United States Patent No. 2,931,943. The tuning of the output circuit which determines the frequency of the transmitted radar pulses is varied continuously by means of a device 3. The transmitter tube is excited or triggered for producing a radar pulse by means of a modulator 4 which is brought in a way known per se to deliver its energy to the magnetron. The modulator is in turn actuated by means of triggering pulses from a triggering pulse unit 5 and the moment for appearance of the triggering pulse relative to the tuning will then determine the frequency of each individual pulse. The triggering pulse unit is assumed in the present case to operate quite independently of the tuning of the tube, the pulse intervals being either varying at random or constant but not related to the tuning interval, whereby the frequency of the produced pulses will vary from pulse to pulse in an irregular way. Alternatively it is, however, also possible to control the frequency change so that the pulses will vary in frequency from pulse to pulse across the frequency range of the magnetron according to a predetermined program.

The magnetron has its output connected to a circulator 6 which leads the produced pulses to a TR-switch 7. This couples the pulses to an antenna 8 for transmission in required direction. The antenna 8 also serves as a receiving antenna for reception of echo pulses. These pulses are led by the TR-switch to a receiver 9 where they are mixed with the output energy from a local oscillator 10. The local oscillator is controlled in frequency by means of a control voltage produced by a unit 11. The control voltage is such that the oscillator frequency during a certain interval after transmission of radar pulse is locked on a value which deviates a predetermined value from the frequency of the radar pulse, while the frequency in an interval before triggering follows the variations in the tuning of the magnetron 1. More particularly the frequency control is brought about such that the output voltage of the oscillator is led via the circulator 6 to the output circuit of the magnetron, while local oscillator energy reflected from this output circuit is led by the circulator and TR-switch 7 to a control input of the follow unit 11.

The follow unit may for example be of the type described in United States Patent No. 3,249,937 and comprises a frequency modulation oscillator for frequency modulating the local oscillator and a phase sensitive rectifier, the reference voltage of which is formed by the output voltage from the frequency modulation oscillator and the signal voltage of which is formed by the local oscillator energy reflected from the output circuit 2 of the magnetron 1. The output voltage from the phase sensitive rectifier will then be a measure as to size and sign of the deviation between the frequency of the local oscillator 8 and the tuning frequency of the magnetron 1. The amplified output voltage from the phase sensitive rectifier is used after combination with the output voltage from the frequency modulation oscillator as a control signal for the oscillator. The center frequency of the oscillator is regulated by negative feed back in the closed regulation circuit to coincidence with the tuning frequency of the magnetron. The follow unit 11 furthermore comprises interruption means for opening the regulation circuit at appearance of triggering pulse from trigger pulse unit 5 and memory means, for example a capacitor, for locking the control voltage of the oscillator upon the value prevailing at the triggering moment during the echo time interval.

In the receiver 9 received echo pulses are mixed with the locked oscillator frequency, whereafter the produced mixing product is filtered in a band pass filter tuned to the selected intermediate frequency for producing an intermediate frequency from the echo pulses. A video signal is then produced in a way known per se by suitable amplification and detection of the intermediate frequency signal, which video signal is fed-out on a lead 13.

The video signal according to the invention is led to a disturbance suppression device 14 and through this to an indicator 15, for example a PPI-screen. To the device 14 is also fed the control voltage of the oscillator, which according to the foregoing is a measure of the oscillator frequency. As the oscillator frequency during each echo time interval is locked on a value which deviates a predetermined magnitude from the frequency of the transmitted pulse the said control voltage during the echo time interval will also be a measure of the frequency of the transmitted pulse. Suitably there is also a correction device not shown for correcting the control voltage at the transmission moment to a value which gives the required frequency deviation as compared with the frequency of the pulse. By this means there will be better coincidence between the real frequency of the transmitted pulse and the frequency which is represented by the locked control voltage.

To the device 14 is also fed a pulse from an echo time flip-flop included in unit 11 at the end of each echo time interval.

The device 14 consists of an integrator 16 which serves to integrate the video signal from receiver 9 and delivers its output voltage to a monostable flip-flop 17. The flip-flop 17 is switched when the integrated voltage from 16 exceeds a certain preset threshold value. The flip-flop 17 has its output connected to a gate 18 receiving at a second input a control voltage from follow unit 11. Flip-flop 17 keeps the gate 18 open in switched position so that the control voltage is led through the gate to a memory circuit 19 during the interval when the flip-flop 17 is switched. Flip-flop 17 has a return time which is appreciably lower than the echo time interval so that upon switching it will normally return during the echo interval. However, if the switching of the flip-flop 17 should occur so late that it does not return by itself before the end of the echo time it is forced to return at the end of the echo time by the pulse from the echo time flip-flop included in the following unit 11.

The control voltage from follow unit 11 is also led to an input of a comparison device 20 which has another input connected to the memory circuit 19. The comparison device 20 delivers its output voltage to a gate 21 receiving at a second input the video signal from receiver 9. The comparison device 20 is made such that when receiving input voltages of different magnitudes on its two inputs it will deliver an output voltage which keeps the gate open. On the contrary upon receiving input voltages of equal magnitude it will deliver an output voltage which closes the gate. In the said first case the video signal is led through the gate to the PPI indicator for being indicated, while in the said second case the video signal is blocked by the gate.

Both the integrator 16 and the memory circuit 19 can suitably be in the form of an integrating RC-circuit. The integrator is of "forgetting" type and has a relatively short discharge time constant, for example appreciably lower than the echo time interval. The integrator will thereby have time to be discharged so that it always starts from zero at each echo interval.

The memory circuit has a long discharge time constant comprising a large number of echo time intervals, for example of the order 100 intervals or more. The charging time constant of the memory circuit 19 may be of the same order as an echo time interval. The charging of the memory circuit to its final value will thereby take place during a number of intervals, since only a portion of the interval is used for charging. The charging time constant of the memory circuit may, however, alternatively be decreased to a so low value that the circuit will be fully charged to its final value during one single disturbed interval.

The described disturbance suppression device operates as follows. At appearance of a disturbance signal having a frequency within the frequency range of the magnetron, the frequency of the transmitted pulses will occasionally coincide with the frequency of the disturbance signal. Each time this occurs the receiver will be sensitive to the disturbance signal since after each transmission the receiver is tuned for reception of signals having a frequency equal to the frequency of the transmitted pulse. During such intervals, called disturbed intervals, a continuous video signal is produced which after integration in device 16 gives rise to an increasing voltage at the input of flip-flop 17. When the switching level of flip-flop 17 is reached gate 18 is opened so that the prevailing control voltage produces charging of the memory circuit 19. This circuit maintains its reached voltage until the next disturbed interval when the charging may proceed. The memory circuit 19 will after one or more disturbed intervals have a voltage equal to the control voltage corresponding to the disturbance frequency. As soon as the control voltage in the following unit assumes this value, equal input voltages will appear at the two inputs of the comparison device 20, whereby the gate 21 is closed and the video signal is blocked. The disturbance signal is thereby prevented from reaching the PPI-indicator 15.

During the transient period, i.e. the charging intervals of the memory circuit 19, a certain disturbance will be produced upon the indicator image due to the fact that the memory circuit is charged during these intervals to different voltages which do not represent disturbed frequencies. After finished charging of the memory circuit, however, only the disturbance signal will be suppressed. If several disturbance signals are present simultaneously or if the disturbance signal covers a broad frequency band a certain disturbance suppressing effect will be produced also in this case but the suppression will be less effective due to the fact that the memory circuit is then forced repeatedly to be recharged.

During a non-disturbed echo interval only echo pulses are received. Each such pulse has a small power content and these pulses can therefore not cause switching of flip-flop 17. The discrimination between a continuous disturbance signal and a normal echo pulse reply is facilitated by the continuous discharge of the integrator appearing due to the short discharging time constant.

The gates and the monostable flip-flop may be of conventional construction and are not described in detail. The integrator and the memory circuit are suitably RC-circuits, while the comparison device may for example be of the type shown in FIG. 2. The illustrated circuit is a transistor circuit comprising two transistors T1 and T2 with a common emitter resistance. The control voltage from the follow unit 11 and the voltage from the memory circuit 19 respectively are fed to the base electrodes of the transistors and the output voltage is derived from the collector electrode through two diodes. At different base voltages, i.e. different voltages from the memory circuit and the follow unit, that transistor which has the highest base voltage will be current conductive, while the remaining transistor is cut-off by the voltage drop across the common emitter resistance. The output voltage from the circuit is determined by the highest collector electrode voltage and will thus in the case of different input voltages be equal to the positive feeding voltage. In the case of equal input voltages or substantially equal input voltages both transistors will be current conductive so that the output voltage decreases. This voltage decrease is fed to the gate 21 for producing blocking of the said gate, which can for example be effected by means of a level sensing device 22, which converts the output voltage from the comparing circuit to a suitable control voltage for gate 21.

The described suppression method can be applied in each radar equipment adapted for transmission of pulses of varying frequency in which for the purpose of controlling a local oscillator a magnitude is stored representing the frequency of each individual pulse. It is not necessary to use the control voltage of the local oscillator as a measure on the frequency of the radar pulse but each magnitude representing this frequency can be used to be stored in the memory circuit to following disturbed intervals. The invention can also be applied in such systems where the triggering is effected by coincidence between the tuning frequency and an auxiliary oscillator frequency which varies in a suitable way, for example the local oscillator frequency, which frequency as in the present case is locked during the echo time interval on a value which is related in a certain way to the frequency of the transmitted pulse.

What is claimed is:

1. A radar system of the type comprising a transmitting device for transmitting pulses of continuously varying frequency, a receiver, means for tuning said receiver to receive echo pulses corresponding to the preceding transmitted pulse, indicator means, means applying the output of said receiver to said indicator means, and means for producing a signal representing the instantaneous frequency of said transmitted pulses; wherein the improvement comprises memory means, integrating means for integrating the output of said receiver, means responsive to the output of said integrating means above a predetermined value for applying said signal to said memory means, means for comparing the signal stored in said memory means with the instantaneous signal output of said means for producing a signal, and means responsive to coincidence between said stored signals and instantaneous signal for blocking application of the output of said receiver to said indicator means.

2. The system of claim 1 in which said integrating means comprises an integrating circuit having a discharge time constant that is shorter than the echo time interval of said system.

3. The system of claim 1 in which said means responsive to the output of said integrating means comprises a monostable flip-flop circuit means having a return time less than the echo time interval of said system, and means applying the output of said integrating means to said monostable circuit means whereby said monostable circuit means switches to its unstable state when the voltage output of said integrating means exceeds said predetermined value.

4. The system of claim 3 comprising first gate means connected to the output of said monostable circuit means for applying said signal representing said instantaneous frequency to said memory means.

5. The system of claim 1 in which said signal representing said instantaneous frequency is a direct voltage having an amplitude representing said instantaneous frequency, and said memory means is a capacitor for storing said voltage.

6. The system of claim 5 in which said memory circuit comprises a discharge circuit for said capacitor having a discharge time constant equal to a substantial number of echo time intervals.

7. The system of claim 1 in which said receiver comprises a local oscillator, said signal being a control voltage for controlling the frequency of said local oscillator, wherein said memory means comprises a capacitor, and said means responsive to said coincidence comprises means responsive to substantial equality of the voltage across said capacitor and said control voltage for blocking application of the output of said receiver to said indicator means.

8. A radar system comprising a transmitting device for transmitting pulses of continuously varying frequency, a receiver for receiving echo pulses, said receiver including a local oscillator and control means for controlling the frequency of said local oscillator, a control circuit for producing a control voltage representing the instantaneous frequency of the pulses transmitted by said transmitter and for holding said control voltage constant for an echo time interval following each transmitted pulse, means applying said control voltage to said control means for controlling the frequency of said local oscillator, an integrating circuit connected to the output of said receiver for integrating the video output thereof, said integrating circuit having a time constant that is less than said echo time interval, a monostable circuit having a first stable state and a second unstable state responsive to triggering thereof, means applying the output voltage of said integrating circuit to said monostable circuit as a triggering voltage whereby said monostable circuit is triggered to said unstable state when the output voltage of said integrating means exceeds a predetermined value, a capacitor, first gate means responsive to the unstable state of said monostable circuit for applying said control voltage to said capacitor, comparing circuit means connected to compare the voltage across said capacitor with said control voltage, indicator means, second gate means for applying the video signal output of said receiver to said indicator means, and means responsive to substantial equality between said control voltage and the voltage across said capacitor for blocking said second gate means.

No references cited.

RODNEY D. BENNETT, *Primary Examiner.*

C. L. WHITHAM, *Assistant Examiner.*